US006647820B2

(12) United States Patent
McKeown et al.

(10) Patent No.: US 6,647,820 B2
(45) Date of Patent: Nov. 18, 2003

(54) VARIABLE POSITION HAND CONTROL MOUNT FOR OPERATOR CONTROLS

(75) Inventors: James Edward McKeown, Vestal, NY (US); Stephen Paul Foisy, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 171 days.

(21) Appl. No.: 09/953,123

(22) Filed: Sep. 17, 2001

(65) Prior Publication Data

US 2003/0052245 A1 Mar. 20, 2003

(51) Int. Cl.[7] ........................ G05G 13/00; B60K 26/00; B64C 13/04

(52) U.S. Cl. .................... 74/471 XY; 74/525; 180/333; 180/334; 244/234

(58) Field of Search ............................ 74/471 XY, 491, 74/493, 471 R, 469, 523, 525, 522; 180/334, 333; 244/234

(56) References Cited

U.S. PATENT DOCUMENTS 4,134,560 A 1/1979 Messerschmidt
4,494,755 A 1/1985 Caillouet, Jr.
5,116,180 A * 5/1992 Fung et al. .................... 414/5
5,247,852 A 9/1993 Guerr
5,320,313 A 6/1994 Crowe
5,326,063 A 7/1994 Stevens
5,664,750 A * 9/1997 Cohen .................. 248/231.71
5,769,363 A 6/1998 Griswold et al.
5,799,537 A 9/1998 Yoneyama
5,861,872 A 1/1999 Stohr et al.
5,876,005 A * 3/1999 Vasconi .................. 248/276.1
5,964,439 A * 10/1999 Johnson .................. 248/278.1
5,964,473 A * 10/1999 Degonda et al. ......... 280/250.1
6,098,935 A 8/2000 Kaplan et al.
6,170,598 B1 1/2001 Furukawa

* cited by examiner

*Primary Examiner*—David Fenstermacher
(74) *Attorney, Agent, or Firm*—Schwartz & Weinrieb

(57) ABSTRACT

A mounting system for an operator control implement comprises a manipulation tube which defines a first axis and upon one end of which an operator control implement is adapted to be mounted. The manipulation tube extends through a housing within which a first clutch assembly is disposed, and in conjunction with which there is disposed a first cam member. A first fixed support member defines a second axis, and a second support member is rotatably mounted upon the first support member. The second support member is fixedly mounted upon the housing, and a second clutch assembly is interposed between the first and second support members. When the manipulation tube is rotated around the first axis, the first cam member causes the first clutch assembly to effectively permit the manipulation tube to go from a LOCKED state to a RELEASED state such that the manipulation tube can undergo axial movements along the first axis, and similarly, the second cam member causes the second clutch assembly to effectively permit the second support member to go from a LOCKED state to a RELEASED state such that the manipulation tube can undergo rotational movements around the second axis. The operator control implement can thus be adjustably positioned with respect to an operator station so as to render the implement accessible to a pilot or operator regardless of the stature of the pilot or operator.

22 Claims, 5 Drawing Sheets

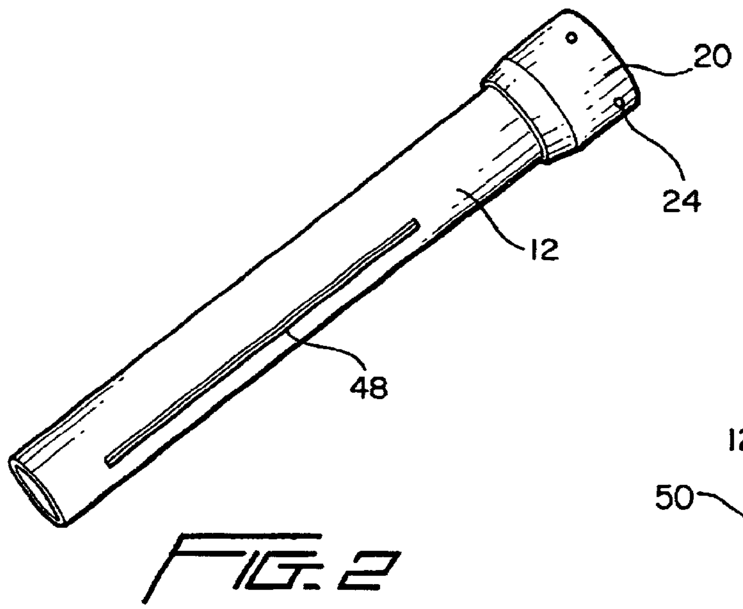
FIG. 2
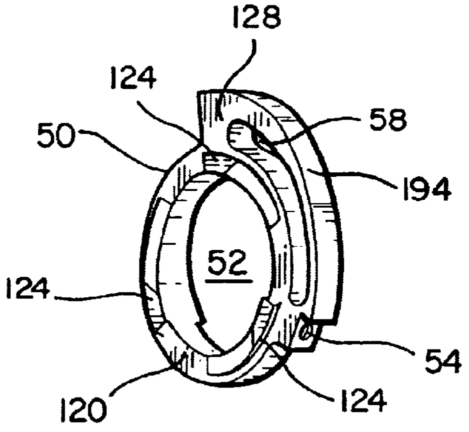
FIG. 5
FIG. 7
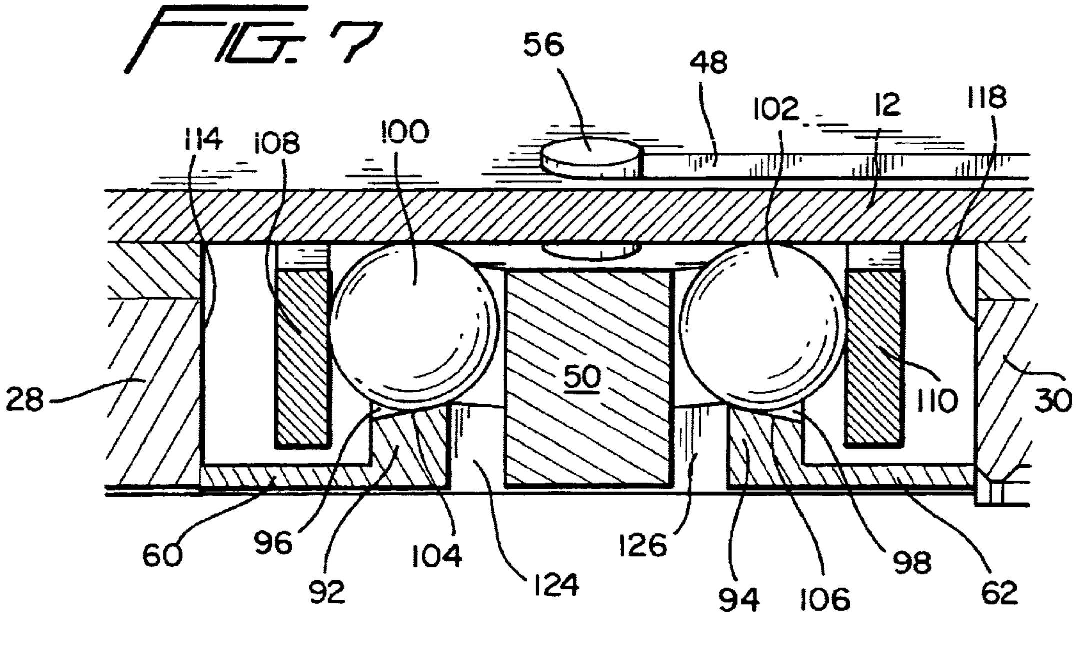

VARIABLE POSITION HAND CONTROL MOUNT FOR OPERATOR CONTROLS

STATEMENT OF GOVERNMENT INTERESTS

The United States Government has a paid-up license in connection with the present invention and accordingly has the right in limited circumstances to require the patent owner to license others on reasonable terms as provided for by means of the terms of United States Government Contract Number N00019-93-C-0196 which was awarded by means of the United States Navy.

FIELD OF THE INVENTION

The present invention relates generally to mounting systems for mounting operator control implements, and more particularly to a new and improved mounting system for mounting operator control implements wherein as a result of the adjustable manipulation of one component of the mounting system, an operator control mount or foundation, upon which an operator control implement is mounted, can be adjustably positioned in both axial and pivotal modes such that the operator control implement is positioned with respect to the operator station so as to be readily accessible to the operator regardless of the stature and reach capabilities of the operator.

BACKGROUND OF THE INVENTION

Control implements are often fixedly mounted within their particular environments so as to obviously be disposed at, for example, a predetermined distance from a location at which a control operator will normally be seated or otherwise disposed such that the control implements are conveniently located and readily accessible to a control operator of average size or stature. It often occurs, however, that, depending upon the size or stature of a particular operator, that is, for those operators who are smaller in stature than an average-sized person, or for those operators who are larger in stature than an average-sized person, the control implements may not in fact be disposed at an optimally convenient, or readily accessible, disposition or location with respect to the seated or otherwise similar disposition of the particular operator. Obviously, still further, when the control implements comprise control mechanisms used, for example, for controlling a vehicle or for operating machinery, if the control implements are not in fact located at optimally convenient or readily accessible positions with respect to the operator's seat or control station, then proper control of the vehicle or machinery is accordingly jeopardized.

A need therefore exists in the art for a new and improved mounting system for mounting operator control implements wherein as a result of the adjustable manipulation of one component of the mounting system, an operator control implement mount or foundation, upon which an operator control implement is mounted, can be adjustably positioned in both axial and pivotal modes such that the operator control implement is positioned with respect to the operator's station so as to be readily accessible to the operator regardless of the stature and reach capabilities of the operator.

OBJECTS OF THE INVENTION

Accordingly, it is an object of the present invention to provide a new and improved mounting system for adjustably mounting operator control implements with respect to an operator station.

Another object of the present invention is to provide a new and improved mounting system for adjustably mounting operator control implements with respect to an operator station so as to overcome various operational disadvantages and drawbacks characteristic of PRIOR ART control implement mounting systems.

An additional object of the present invention is to provide a new and improved mounting system for adjustably mounting operator control implements with respect to an operator station in both an axial mode along a first axis and in a pivotal mode around a second axis which is disposed transversely or perpendicular to the first axis.

A further object of the present invention is to provide a new and improved mounting system for adjustably mounting operator control implements with respect to an operator station in both an axial mode along a first axis and in a pivotal mode around a second axis which is disposed transversely or perpendicular to the first axis as a result of the manipulation of a single actuation mechanism.

A last object of the present invention is to provide a new and improved mounting system for adjustably mounting operator control implements with respect to an operator station in both an axial mode along a first axis and in a pivotal mode around a second axis which is disposed transversely or perpendicular to the first axis as a result of the manipulation of a single actuation mechanism whereby the operator control implement can be positioned with respect to the operator station so as to be readily accessible to the operator regardless of the stature and reach capabilities of the operator.

SUMMARY OF THE INVENTION

The foregoing and other objectives are achieved in accordance with the teachings and principles of the present invention through the provision of a new and improved mounting system, for adjustably mounting operator control implements with respect to an operator station in both an axial mode along a first axis and in a pivotal mode around a second axis which is disposed transversely or perpendicular to the first axis, wherein the mounting system comprises a tubular member upon a first end of which there is affixed a first mounting flange for mounting an operator control implement. An axially intermediate portion of the tubular member is inserted through a housing within which a first dual set of locking ball detents is provided. A cam member is operatively connected to the tubular member such that the tubular member can be moved axially with respect to the cam member but cannot be rotated with respect to the cam member. Consequently, when the tubular member is rotated a predetermined amount, such as, for example, a quarter-turn or 90°, the cam member is rotated accordingly therewith so as to cause the dual set of locking ball detents to be moved to a released position whereby the tubular member is free to move axially to an axially adjusted position.

A second mounting flange is bolted to the housing, and the second mounting flange is pivotally mounted upon a third mounting flange through means of a bearing assembly such that the tubular member is pivotally mounted upon the third mounting flange about an axis which is transverse or perpendicular to the tubular axis. A second dual set of locking ball detents is operatively associated between the second and third mounting flanges, and the cam member is also operatively associated with the second dual set of locking ball detents such that when the tubular member is rotated through means of the aforenoted quarter turn or 90°, the cam member will also move the second dual set of locking ball detents to a released position whereby the tubular member, through means of the second flange member, is free to pivot around the transverse or perpendicular axis to a pivotally adjusted position. Rotation of the tubular member back to its original position causes the cam member to permit the first and second dual sets of locking ball detents to return to the their locking mode positions whereby the tubular member, and the operator control implement mounted upon the first flange member, is now fixed at the axially and pivotally adjusted positions.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a perspective view of the tubular manipulation member of the mounting system disclosed within FIG. 1;

FIG. 5 is a perspective view of the primary cam member disclosed within FIGS. 3 and 4;

FIG. 7 is an enlarged cross-sectional view of the assembled system disclosed within FIG. 6 wherein the details of the primary cam member and the primary linear one-way clutch system are disclosed.

DETAILED DESCRIPTION OF THE PREFERRED EMBODIMENT

Figure 1:
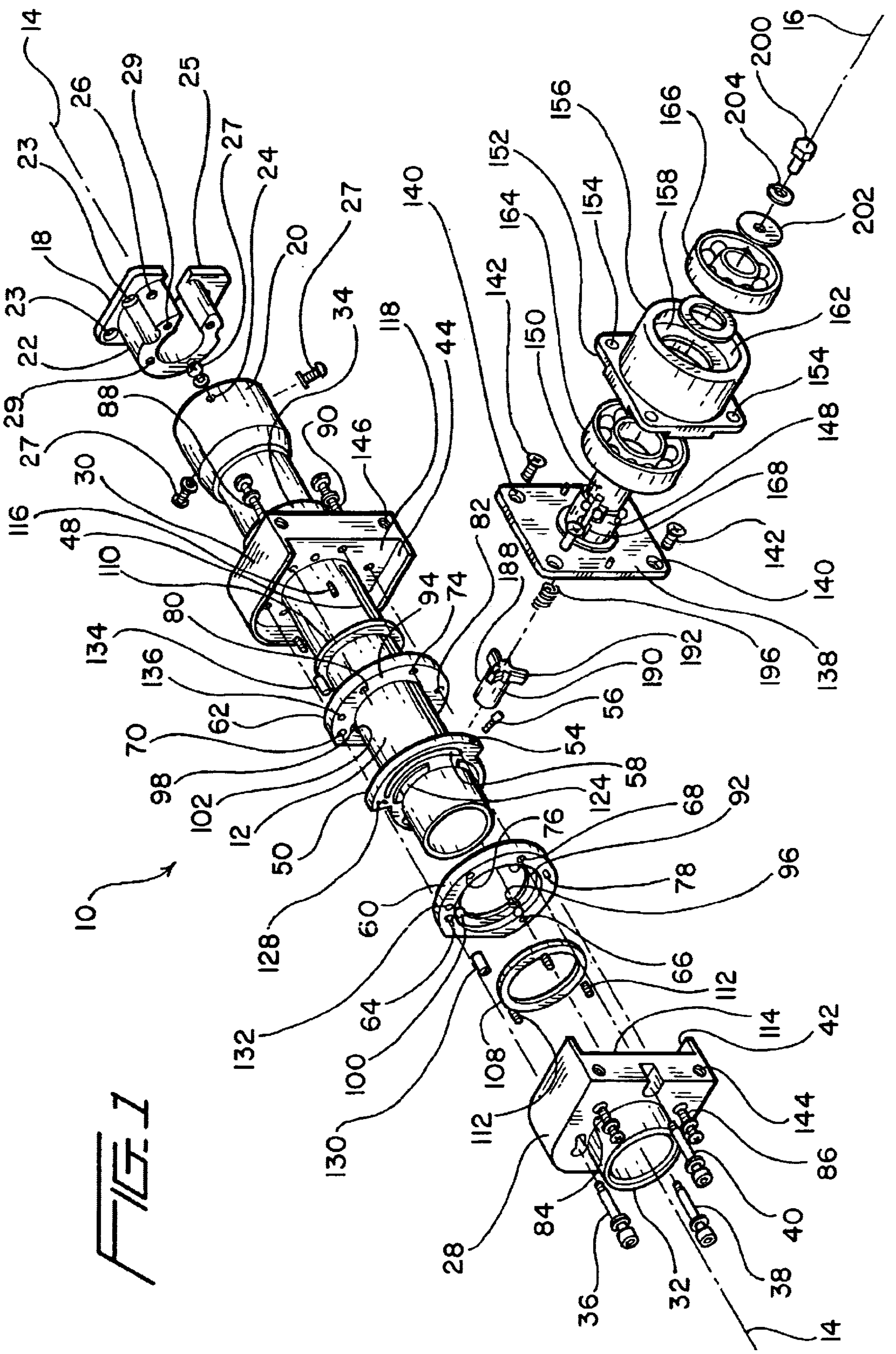
FIG. 1 is an exploded view of a new and improved mounting system, constructed in accordance with the principles and teachings of the present invention, for mounting operator control implements wherein as a result of the adjustable manipulation of a tubular mounting member and an operatively associated primary cam member of the mounting system, the operator control implement mount or foundation, upon which an operator control implement is mounted, can be adjustably positioned in both axial and pivotal modes such that the operator control implement is positioned with respect to the operator's station so as to be readily accessible to the operator regardless of the stature and reach capabilities of the operator.

Referring now to the drawings, and more particularly to FIG. 1 thereof, a new and improved mounting system, constructed in accordance with the teachings and principles and teachings of the present invention, for mounting operator control implements, wherein the operator control implement mount or foundation upon which an operator control implement is mounted can be adjustably positioned in both axial and pivotal modes such that the operator control implement is positioned with respect to an operator's station so as to be readily accessible to the operator regardless of the stature and reach capabilities of the operator, is disclosed and is generally indicated by the reference numeral 10. More particularly, the new and improved mounting system 10 is seen to comprise a manipulation tube 12 which, in accordance with the principles and teachings of the present invention, is adapted for axial movement along a first longitudinal axis 14 and for pivotal movement around a second axis 16 which is transverse or perpendicular to the first axis 14. The manipulation tube 12 is adapted to have a control implement, not shown, mounted upon the right distal end portion thereof, such that the control implement, not shown, is able to be optimally positioned with respect to, for example, an aircraft pilot or other vehicle or machinery operator, through means of the adjustable axial and pivotal movements of the manipulation tube 12, and accordingly, a control implement mounting flange assembly 18 is adapted to be fixedly mounted upon the right distal end portion of the manipulation tube 12.

Figure 6:
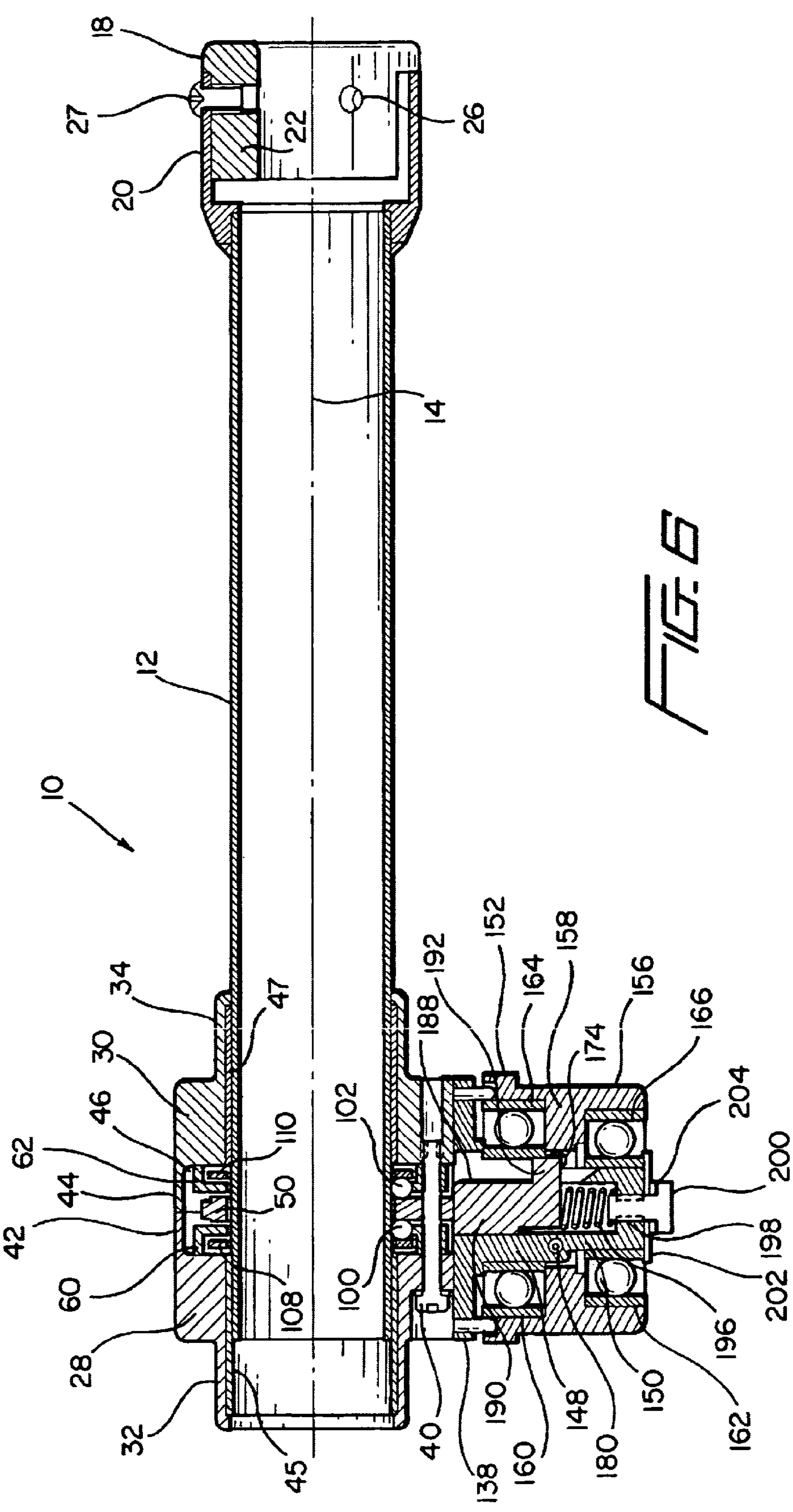
FIG. 6 is a longitudinal, axial cross-sectional view of the mounting system disclosed within FIG. 1 when the disclosed mounting system of FIG. 1 is fully assembled.

More particularly, the right distal end portion of the manipulation tube 12 comprises a tubular socket portion 20 within which an axially extending stem portion 22 of the control implement mounting flange assembly 18 is to be disposed and seated as may best be seen in FIG. 6. In order to fixedly secure the stem portion 22 of the control implement mounting flange assembly 18 within the tubular socket portion 20 of the manipulation tube 12, three apertures 24, only one of which is shown in FIG. 1, are provided within the tubular socket portion 20 of the manipulation tube 12 at equiangularly spaced locations 120° apart. In a similar manner, three internally threaded bores 26 are defined within the axially extending stem portion 22 of the control implement mounting flange assembly 18, only one of which is also shown in FIG. 1, whereby suitable fasteners 27 are adapted to be inserted through the apertures 24 defined within the tubular socket portion 20 of the manipulation tube 12 and threadedly engaged within the bores 26 of the axially extending stem portion 22 of the control implement mounting flange assembly 18. Four threaded apertures 23, only two of which are shown in FIG. 1, are provided within the substantially square-shaped flange portion 25 of the assembly 18 for receiving suitable fasteners, not shown, for mounting the control implement, also not shown, upon the flange assembly 18, and four additional axial apertures 29 are defined within the stem portion 22 for receiving suitable fasteners, not shown, by means of which a control cable connector, not shown but provided for the control implement, can be mounted upon the flange assembly 18.

The manipulation tube 12 is adapted for axially oriented adjustable movements within a pair of left and right housing half-sections 28 and 30, and therefore, the manipulation tube 12 must be properly supported during such axially oriented adjustable movements. As can best be appreciated as a result of additional reference again being made to FIG. 6, each one of the housing half-sections 28,30 is therefore provided with an integral axially oriented tubular extension portion 32 and 34, respectively, for providing an additional or requisite amount of axial support for the manipulation tube 12 during its adjustable axial movements with respect to the housing half-sections 28,30, as well as during the pivotal movements of the manipulation tube 12 around the axis 16, as will become more apparent hereinafter. In order to fixedly secure the housing half-sections 28, 30 together, a plurality of axially oriented bolt fasteners 36,38,40 are provided, and as can be appreciated from both FIGS. 1 and 6, each one of the housing half-sections 28,30 is provided with an axially inwardly oriented flanged portion 42,44. Accordingly, as can best be appreciated from FIG. 6, when the housing half-sections 28,30 are mated and secured together by means of the bolt fasteners 36,38,40, an internal cavity 46 is defined between the mated housing half-sections 28,30. Bearing sleeve members 45,47 are also interposed between the outer peripheral surface of the manipulation tube 12 and inner peripheral surface portions of the tubular extension portions 32,34 of the housing half-sections 28,30 so as to facilitate the axial and rotational movements of the manipulation tube 12 with respect to the housing half-sections 28,30.

Figure 3:
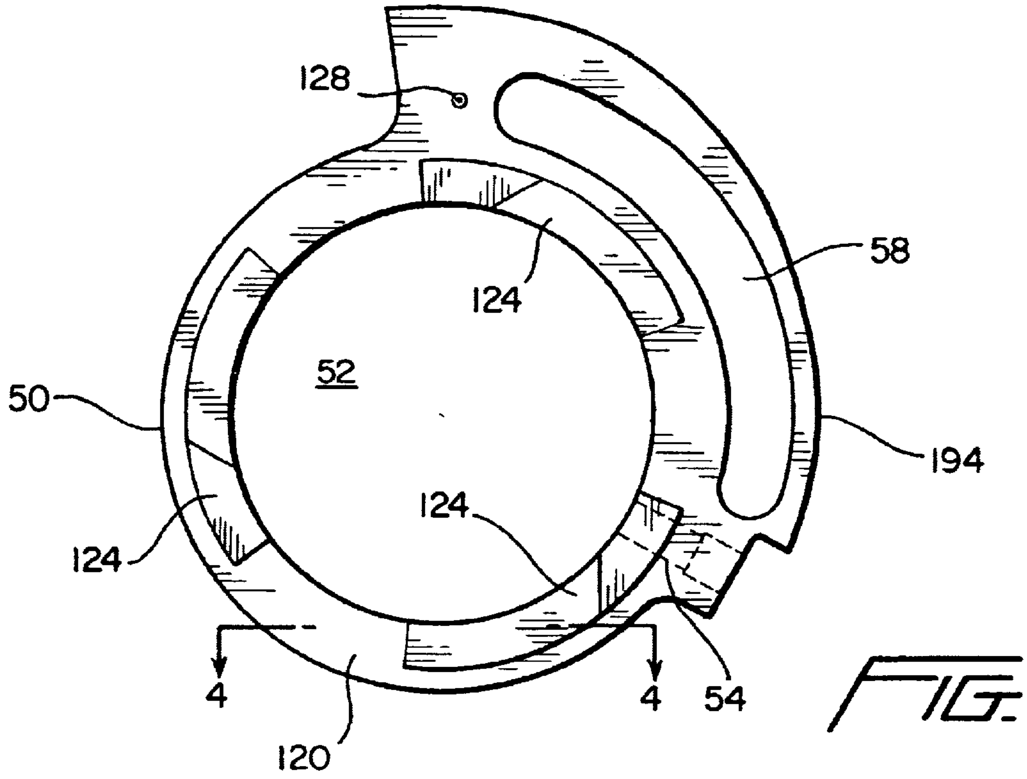
FIG. 3 is a side elevational view of the primary cam member of the mounting system disclosed within FIG. 1.
Figure 4:
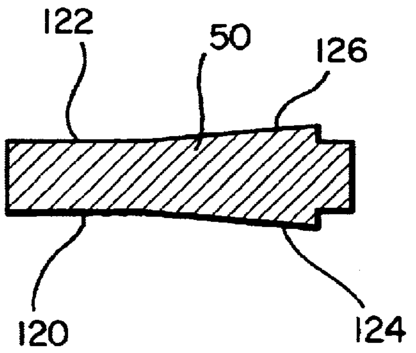
FIG. 4 is a cross-sectional view of the primary cam member disclosed within FIG. 3 as taken along the lines 4—4 of FIG. 3.

With reference now being made to FIGS. 1–7, the mechanism developed in accordance with the principles and teachings of the present invention for firstly achieving the axially adjustable movements of the manipulation tube 12, as well as the control implement mounting flange assembly 18 upon which a control implement, not shown, is adapted to be mounted for use by means of a vehicle pilot or operator, machinery operator, or the like, will now be described. More particularly, as best seen from FIG. 2, the manipulation tube 12 is seen to have an axially oriented slot 48 defined within a peripheral wall portion thereof, and a primary annular cam member 50, having a central bore 52 defined therethrough, as seen in FIG. 3, is adapted to have the manipulation tube 12 inserted through the central opening or bore 52 such that the primary cam member 50 is annularly disposed around the manipulation tube 12 as seen in FIG. 1. The cam member 50 is further provided with a radial bore 54 within which a set screw 56 is adapted to be threadedly disposed. When the set screw 56 is properly disposed and set within the radial bore 54, the radially inner end of the set screw 56 will project into and be disposed within the axially oriented slot 48 defined within the manipulation tube 12. In this manner, relative rotation between cam member 50 and manipulation tube 12 is effectively prevented, however, manipulation tube 12 is permitted to move axially relative to cam member 50 as permitted by means of the relative movement between the set screw 56 and the axially oriented slot 48.

Accordingly, as will be more fully discussed hereinafter, when axial and pivotal adjustments are to be made in conjunction with the control implement, not shown but mounted upon the control implement mounting flange assembly 18, as a result of the axial movements of the manipulation tube 12 along axis 14 as well as the pivotal movements of the manipulation tube 12 around transverse axis 16, the manipulation tube 12 and the cam member 50 will be pivoted or rotated in the counterclockwise direction, as viewed from implement mounting flange assembly 18, around axis 14 and through a rotational extent of 90° from a LOCKED position as illustrated in FIG. 1 to a RELEASED position. In order to effectively predetermine such LOCKED and RELEASED positions, or, in other words, in order to effectively predetermine the rotational extents or limits of the manipulation tube 12 and the cam member 50 between such LOCKED and RELEASED positions, the cam member 50 is further provided with an arcuately shaped, circumferentially oriented cut-out or slot 58, and the bolt fastener 40, which was one of the bolt fasteners 36,38,40 used to connect the housing half-sections 28,30 together, is adapted to be inserted through the slot 58. Consequently, when the cam member 50 is rotated relative to the bolt fastener 40, the slotted portion 58 of the cam member 50 will move relative to the bolt fastener 40 such that when the bolt fastener 40 in effect encounters the opposite ends of the slot 58, the cam member 50 will have reached one of the LOCKED or RELEASED positions.

With reference now being made to FIGS. 1 and 3–7, the mounting system 10 is seen to further comprise a pair of axially spaced clutch rings 60,62 which are disposed upon opposite sides of the cam member 50, and it is seen that each one of the clutch rings 60,62 is provided with three, circumferentially and equiangularly spaced apertures 64,66, 68 and 70,72,74, respectively, through which the housing half-section bolt fasteners 36,38,40 can pass. In addition, each one of the clutch rings 60,62 is respectively provided with a pair of apertures 76,78 and 80,82 for respectively receiving a pair of bolt fasteners 84,86 and 88,90 for securing each one of the clutch rings 60,62 to a respective one of the housing half-sections 28,30. Each one of the clutch rings 60,62 further comprises a radially inwardly projecting wall 92,94, and each one of the walls 92,94 is provided with a set of three circumferentially and equiangularly spaced slots or apertures 96,98 within which a set of three detent balls 100,102 is adapted to be disposed. As best seen in FIG. 7, the radially inner surface 104,106 of each one of the walls 92,94 is sloped downwardly such that, more particularly, inner wall surface 104 slopes downwardly toward the left as viewed in FIG. 7, while inner wall surface 106 slopes downwardly toward the right as viewed in FIG. 7. In conjunction with the clutch rings 60,62 and the sets of detent balls 100,102 supported upon the radially inner surfaces 104,106 of the radially inwardly projecting walls 92,94, an annular clutch plate 108,110 is respectively associated with each clutch ring 60,62, and as best appreciated from FIG. 6, the cam member 50, the clutch rings 60, 62 and detent balls 100,102, and clutch plates 108,110 are all disposed within the internal cavity 46 defined between the housing half-sections 28,30. A set of circumferentially arranged, equiangularly spaced springs 112 are adapted to be interposed between an interior wall surface 114 of housing half section 28 and clutch plate 108, and a set of circumferentially arranged, equiangularly spaced springs 116 are adapted to be similarly interposed between an interior wall surace 118 of housing half-section 30 and clutch plate 110 so as to respectively bias the clutch plates 108,110 into contact with the sets of detent balls 100,102. In this manner, the sets of detent balls 100,102 are normally disposed toward their positions upon wall surfaces 104,106 as illustrated in FIG. 7 at which the detent balls 100,102 are also engaged with outer peripheral surface portions of the manipulation tube 12 whereby the manipulation tube 12 cannot be axially moved and adjusted and will be disposed and retained at a particular axially LOCKED position. The reason for this can be best appreciated from FIG. 7.

More particularly, with the detent balls 100,102 disposed at their locked positions illustrated in FIG. 7, if the manipulation tube 12 is attempted to be axially moved, for example, toward the right as viewed in FIG. 7, the manipulation tube 12 tends to drag the clutch detent balls 100 toward the right thereby tending to move the detent balls 100 further into a wedged stated between the outer peripheral surface portions of the manipulation tube 12 and the upwardly sloped surface 104 of the clutch ring 60. Accordingly, the manipulation tube 12 is LOCKED and cannot be moved axially toward the right. In a similar but opposite mode, if the manipulation tube 12 is attempted to be moved, axially, for example, toward the left as viewed in FIG. 7, the manipulation tube 12 tends to drag the clutch detent balls 102 toward the left thereby tending to move the detent balls 102 further into a wedged stated between the outer peripheral surface portions of the manipulation tube 12 and the upwardly sloped surface 106 of the clutch ring 62. Accordingly, the manipulation tube 12 is LOCKED and cannot be moved axially toward the left.

With reference now again being made to FIGS. 1 and 3–7, in order to be able to move the sets of detent balls 100,102 from their LOCKING positions illustrated most clearly in FIG. 7 to RELEASING positions at which the detent balls 100,102 would effectively be disengaged from the outer peripheral surface portions of the manipulation tube 12, the primary cam member 50 is further provided upon opposite side surfaces 120,122 upon each one of which there is respectively provided a set of three circumferentially arranged, equiangularly spaced camming ramps 124,126 each one of which comprises a tapered structure which becomes axially enlarged as one proceeds in the clockwise direction as viewed from the end of the system 10 at which the control implement mounting flange assembly 18 is disposed. Accordingly, as may best be appreciated from FIGS. 1 and 7, when the manipulation tube 12 is rotated in the counterclockwise direction as viewed from the end of the system 10 at which the control implement mounting flange assembly 18 is disposed, the cam member 50 will be rotated along with the manipulation tube 12, as a result of the pinned engagement therebetween by means of set screw 56, whereby the sets of camming ramps 124,126 will become progressively more engaged with their operatively associated sets of detent balls 100,102 such that the detent balls 100,102 will be moved axially away from each other, against the respective biasing forces of the clutch plates 108,110 and their operatively associated biasing clutch springs 112,116, whereby the detent balls 100,102 will be moved axially down the sloped surfaces 104, 106 so as to be effectively disengaged from the outer peripheral surface portions of the manipulation tube 12. The manipulation tube 12 is therefore now free to be axially moved or adjusted to a particularly desired axial position with respect to the housing half-sections 28,30 so as to optimally position the control implement, not shown and which is to be attached to the control implement mounting flange assembly 18, at a convenient location with respect to a vehicle pilot or operator, machinery operator, or the like.

Once such optimal adjustment position has been achieved, the manipulation tube 12 and the cam member 50 are rotated in the reverse or clockwise direction until all of the components, which interact together to define the LOCKED and RELEASED states or positions as has been described hereinbefore, are again disposed in their original positions whereby the manipulation tube 12 will be disposed at its axially LOCKED position or state. As can be further appreciated from FIGS. 1, 3, and 5, the side surface 120 of the cam member 50 is provided with a recessed hole or cavity 128, and the side surface 122 of the cam member 50 is provided with a similar hole or cavity, not shown. A set screw 130 is adapted to be threadedly engaged within an aperture 132 defined within the clutch ring 60, and a similar set screw 134 is adapted to be threadedly engaged within an aperture 136 defined within the clutch ring 62. The tip portions of the set screws 130,134 are provided with small, spring-biased balls, not shown, and accordingly, when the manipulation tube 12 and the cam member 50 are rotatably returned to their LOCKED positions, the spring-biased balls, not shown, mounted upon the tip portions of the set screws 130,134 will become engaged within their respective recessed holes or cavities 128 so as to provide a tactile indication to the operator that the LOCKED state or position of the manipulation tube 12 and cam member 50 has been achieved.

Having described the cam-clutch mechanism developed and constructed in accordance with the principles and teachings of the present invention for achieving the axial LOCKED and RELEASED states for the manipulation tube 12 and the operatively attached pilot or operator control implement, not shown, a description of the cam-clutch mechanism developed and constructed in accordance with the principles and teachings of the present invention for achieving the rotational or pivotal LOCKED and RELEASED states for the manipulation tube 12 and the operatively attached pilot or operator control implement, not shown, will now be described. Referring then to FIGS. 1, 3, 5, 6, and 8, a first rotary flanged plate assembly 138, having a substantially rectangular configuration, is provided with a plurality of apertures 140 within the four corner regions thereof for receiving suitable fasteners 142 by means of which the first rotary flanged plate assembly 138 is adapted to be fixedly mounted upon the housing half-sections 28,30. The housing half-sections 28,30 are respectively provided with threaded apertures 144,146 for receiving the fasteners 142, and consequently, when the manipulation tube 12 and the control implement, not shown but which is adapted to be mounted upon the control implement mounting flange assembly 18, are to be rotated or pivoted around or with respect to the axis 16, first rotary flanged plate assembly 138 will rotate or pivot therewith. The first rotary flanged plate assembly 138 is further provided with an integral, axially projecting tubular section which has a stepped configuration comprising a first large diameter tubular section 148 and a second small diameter tubular section 150.

A second fixed flanged plate assembly 152, having a substantially square-shaped configuration, is provided with a plurality of apertures 154 disposed within the corner regions thereof for receiving suitable fasteners, not shown, by means of which the second fixed flanged plate assembly 152 can be fixedly mounted upon static support structure, also not shown, located at the operator's control station. The second fixed flanged plate assembly 152 is provided with an axially projecting tubular section 156 which is integral therewith, and as can best be appreciated from FIG. 6, tubular section 156 has an internal, radially inwardly projecting annular wall 158 which effectively separates or divides the interior of the tubular section 156 into a first relatively large chamber 160 and a second relatively small chamber 162 for respectively housing the first and second large and small diameter tubular sections 148,150 integral with the first rotary flanged plate 138. In addition to housing or accommodating the first and second relatively large and small diameter tubular sections 148,150 integral with the first rotary flanged plate assembly 138, a first relatively large bearing assembly 164 is adapted to be disposed within the first large chamber 160 so as to be radially interposed between the first large diameter tubular section 148 and the internal peripheral wall of tubular section 156 defining the first large chamber 160, and in a similar manner, a second relatively small bearing assembly 166 is adapted to be disposed within the second small chamber 162 so as to be radially interposed between the second small diameter tubular section 150 and the internal peripheral wall of tubular section 156 defining the second small chamber 162. In this manner, rotation of the first and second large and small diameter tubular sections 148,150 of the first rotary flanged plate assembly 138 within the tubular section 156 of the second fixed flanged plate assembly 152 is facilitated.

Figure 8:
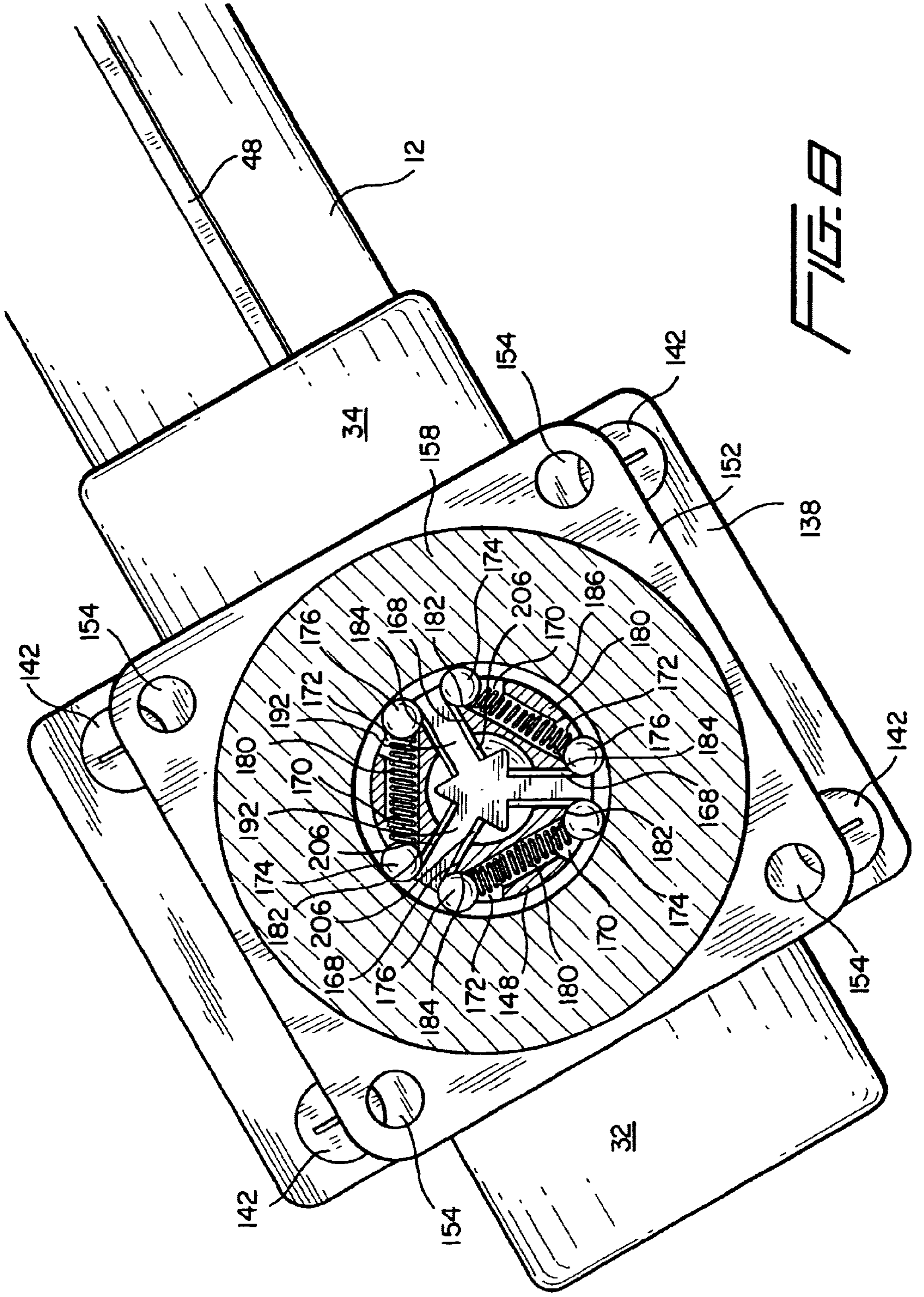
FIG. 8 is a cross-sectional view of the pivotal mounting subassembly, by means of which the tubular member and the operator control implement mount or foundation are able to undergo pivotal adjustment around an axis transverse or perpendicular to the longitudinal axis and axial adjustment movement of the tubular member, wherein the details of the secondary cam member and the secondary pivotal one-way clutch system are disclosed.

With reference lastly being made to FIGS. 1, 6, and 8, three circumferentially arranged, equiangularly spaced axially oriented slots 168 are provided within first and second large and small diameter tubular sections 148,150 of the rotary flanged plate assembly 138. Disposed upon the right side of each one of the slots 168, as viewed in FIG. 8, there is provided a first set of recesses or pockets 170, and disposed upon the left side of each one of the slots 168, as viewed in FIG. 8, there is provided a second set of recesses or pockets 172. In addition, within each one of the first set of recesses or pockets 170, there is disposed a first set of detent balls 174, and in a similar manner, within each one of the second set of recesses or pockets 172, there is disposed a second set of detent balls 176. Three bores 178, arranged along chordal directions and defined within large diameter tubular section 148 of rotary plate assembly 138, are provided so as to interconnect one of the pockets or recesses 170 to one of the pockets or recesses 172, and a coil spring 180 is disposed within each one of the chordal bores 178 such that each one of the coil springs 180 biases a pair of detent balls 174,176 in opposite directions into engagement with detent ball seat portions 182 and 184, respectively, as well as into engagement with the internal peripheral surface 186 of the annular dividing wall 158 of flanged plate assembly 152.

Accordingly, as can best be appreciated from FIG. 8, when the component parts are disposed at their illustrated positions, and when large diameter tubular section 148, along with rotary flanged plate 138, housing half-sections 28,30, and manipulation tube 12, is attempted to be rotated around axis 16 and relative to fixed flanged plate 152 in the clockwise direction, the first set of detent balls 174 will tend to be wedged between their ball seats 182 and the internal peripheral surface 186 of the annular dividing wall 158 of the tubular section 156 of the fixed flanged plate assembly 152 thereby preventing such relative rotation. The manipulation tube 12, and the control implement mounting flange assembly 18 are thus disposed in a clockwise-oriented rotationally LOCKED state. In a similar but reverse manner, when large diameter tubular section 148, along with rotary flanged plate 138, housing half-sections 28,30, and manipulation tube 12, is attempted to be rotated around axis 16 and relative to fixed flanged plate 152 in the counterclockwise direction, the second set of detent balls 176 will tend to be wedged between their ball seats 184 and the internal peripheral surface 186 of the annular dividing wall 158 of the tubular section 156 of the fixed flanged plate assembly 152 thereby likewise preventing such relative rotation. The manipulation tube 12, and the control implement mounting flange assembly 18 are thus disposed in a counterclockwise-oriented rotationally LOCKED state.

In order to permit large diameter tubular section 148, along with rotary flanged plate 138 and housing half-sections 28,30 to be rotated so as to, in turn, permit rotational positional adjustment of the manipulation tube 12 and the control implement mounting flange assembly 18, a secondary cam member 188 is adapted to be axially movably disposed within the large diameter tubular section 148 which is integral with the rotary flanged plate 138, as may best be appreciated from FIGS. 1, 6, and 8. The secondary cam member 188 comprises a rearward cylindrical stem portion 190 and a plurality of radially oriented legs 192 disposed upon the forward portion of the secondary cam member 188 and arranged within a substantially Y-shaped array. As can best be appreciated from FIG. 8, each one of the radially oriented legs 192 of the secondary cam member 188 is respectively disposed within one of the axially oriented slots 168, and as can be best appreciated from FIG. 6, the rearward stem portion 190 of the secondary cam member 188 is normally spring-biased into engagement with an external peripheral, circumferential surface portion 194 of the primary cam member 50, which is best seen in FIG. 3, by means of a coil spring 196. The forward end of the small diameter tubular portion 150 of the rotary flanged plate assembly 138 is provided with a threaded bore 198, as best seen in FIG. 6, and a suitable screw fastener 200 is adapted to be threadedly engaged within the bore 198, a washer 202 and lock washer 204 being operatively associated with screw fastener 200. As a result of such assembly, it is seen that the forward end of the coil spring 196 is seated upon the inner end of the screw fastener 200.

As best seen in FIG. 8, the opposite sides of each one of the legs 192 of the secondary cam member 188 is provided with a pair of chamfered surfaces 206, and thus, as can be appreciated from FIGS. 1, 3, 6, and 8, when the primary cam member 50 is rotated in the counterclockwise direction, as viewed from control implement mounting flange assembly 18, as a result of the counterclockwise rotation of the manipulation tube 12, the external peripheral surface portion 194 of primary cam member 50 will cause the secondary cam member 188 to be moved axially along axis 16 against the biasing force of spring 196. Accordingly, as can be best appreciated from FIG. 8, the oppositely disposed chamfered surface portions 206 of each cam leg 192 will engage the two sets of detent balls 174,176 and cause the detent balls 174, 176 to be moved, against the biasing forces of their operatively associated springs 180, off of their seats 182,184 such that the detent balls 174,176 are no longer in effect wedged between their seats 182,184 and the interior peripheral surface 186 of the dividing wall 158 of the tubular section 156 of the fixed flanged plate assembly 152. Therefore, the rotary flanged plate assembly 138, to which the manipulation tube 12 and control implement mounting flange assembly 18 are fixedly mounted through means of housing half-sections 28, 30, is now disposed in a rotationally RELEASED state and can be rotationally moved with respect to the fixed flanged plate assembly 152 so as to rotationally positionally adjust the manipulation tube 12 and the control implement mounting flange assembly 18 to a desired position. When the manipulation tube 12 and the control implement mounting flange assembly 18 have been rotationally moved to the desired adjusted position, the manipulation tube 12, and the pinned primary cam member 50, are manually rotated back to their normal positions whereby the external peripheral cam surface 194 of the primary cam member 50 will permit the secondary cam member 188 to in effect be retracted under the influence of the biasing spring 196 whereby, in turn, the detent balls 174,176 will once again be seated upon their seat portions 182,184 so as to dispose the rotary flanged plate assembly 138 in its rotationally LOCKED state. Manual adjustment of the manipulation tube 12 and the control implement mounting flange assembly 18 is thus complete.

Thus, it may be seen that in accordance with the principles and teachings of the present invention, a new and improved mounting system, for mounting a pilot or operator control implement, has been developed whereby as a result of the manipulative movement of a single component of the system, the control implement can be axially and rotationally positionally adjusted so as to desirably dispose the control implement at a desired location with respect to the pilot or operator station. In particular, by means of rotating the manipulation tube 12, and the cam member 50 pinned thereto, the cam member 50 actuates the detent balls 100, 102 so as to permit the manipulation tube 12 to attain its axial RELEASED state from its axial LOCKED state. In addition, as a result of the rotation of the cam member 50, the primary cam member 50 actuates the secondary cam member 188 which in turn actuates the detent balls 174,176 so as to permit the manipulation tube 12 to attain its rotational RELEASED state from its rotational LOCKED state. In this manner, the control implement can be located at a convenient distance and orientation with respect to the pilot or operator station regardless of the height, size, stature, or other physical characteristics of the particular pilot or operator. It can be further appreciated that the new and improved mounting system of the present invention has utility in connection with, for example, pilots or operators of vehicles, as well as operators of machinery, in order to properly dispose the control implements with respect to the pilot or operator station.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A control implement mounting system for mounting a control implement with respect to an operator station, comprising:

a first fixed support member;

a manipulation member having an operator control implement mounted thereon; and means mounting said manipulation member upon said fixed support member such that when said manipulation member is moved in a first mode between first and second positions with respect to said fixed support member, said manipulation member, having said operator control implement mounted thereon, can be moved between first and second positions in both second and third modes with respect to said fixed support member such that said operator control implement can be positionally adjusted with respect to an operator station so as to adjustably position said operator control implement with respect to the operator station and thereby optimally position said operator control implement with respect to an operator disposed at the operator station whereby said operator control implement is readily accessible to the operator at the operator station regardless of the size and stature of the operator.

2. The mounting system as set forth in claim 1, further comprising:

a housing through which said manipulation member extends;

a second support member fixedly mounted upon said housing and rotatably connected to said first fixed support member;

first clutch means disposed within said housing and operatively associated with said manipulation member for disposing said manipulation member in a LOCKED state when said manipulation member is disposed at said first position of said first mode such that said manipulation member cannot be moved between said first and second positions of said second mode, and for disposing said manipulation member in a RELEASED state when said manipulation member is disposed at said second position of said first mode such that said manipulation member can be moved between said first and second positions of said second mode; and second clutch means interposed between said first and second support members for disposing said manipulation member in a LOCKED state when said manipulation member is disposed at said first position of said first mode such that said manipulation member cannot be moved between said first and second positions of said third mode, and for disposing said manipulation member in a RELEASED state when said manipulation member is disposed at said second position of said first mode such that said manipulation member can be moved between said first and second positions of said third mode.

3. The mounting system as set forth in claim 2, wherein:

said manipulation member defines a first axis;

said fixed support member defines a second axis;

said first movement mode of said manipulation member comprises rotational movements of said manipulation member around said first axis;

said second movement mode of said manipulation member comprises axial movements along said first axis; and said third movement mode of said manipulation member comprises rotational movements of said manipulation member around said second axis.

4. The mounting system as set forth in claim 3, wherein said first clutch means comprises:

first and second clutch rings;

first and second sets of detent balls respectively mounted upon said first and second clutch rings so as to be movable between first positions at which said first and second sets of detent balls are engaged with said manipulation member so as to dispose said manipulation member in said LOCKED state with respect to movements in said second mode, and second positions at which said first and second sets of detent balls are disengaged from said manipulation member so as to dispose said manipulation member in said RELEASED state with respect to movements in said second mode whereby said manipulation member can be moved in opposite axial directions along said first axis; and a first cam member operatively connected to said manipulation member for moving first and second sets of detent balls between said first and second positions as said manipulation member is moved between said first and second positions of said first mode.

5. The mounting system as set forth in claim 4, wherein said second clutch means comprises:

first and second sets of detent balls respectively mounted upon said second support member so as to be movable between first positions at which said first and second sets of detent balls are engaged with said first fixed support member so as to dispose said manipulation member in said LOCKED state with respect to rotational movements in said third mode whereby said manipulation member cannot be moved in opposite rotational directions around said second axis, and second positions at which said first and second sets of detent balls are disengaged from said first fixed support member so as to dispose said manipulation member in said RELEASED state with respect to rotational movements in said third mode whereby said manipulation member can be moved in opposite rotational directions around said second axis; and a second cam member operatively engaged with said first cam member for moving first and second sets of detent balls of said second clutch means between said first and second positions as said manipulation member is moved between said first and second positions of said first mode.

6. The mounting system as set forth in claim 5, wherein:

a plurality of slots are defined within said second support member; and said second cam member comprises a plurality of leg members disposed within a substantially Y-shaped array for disposition within said plurality of slots for engaging said first and second sets of detent balls of said second clutch means.

7. The mounting system as set forth in claim 5, wherein:

said manipulation member has an axially oriented slot defined within an external peripheral surface portion thereof; and said first cam member has a set screw mounted therein for disposition within said axially oriented slot defined within said external peripheral surface portion of said manipulation member such that rotational movements of said manipulation member within said first mode cause said first cam member to undergo corresponding rotational movements.

8. The mounting system as set forth in claim 7, further comprising:

an arcuate slot defined within said first cam member and comprising an arcuate extent of 90°; and a pin mounted within said housing and extending into said arcuate slot defined within said first cam member for limiting said rotational movements of said manipulation member and said first cam member to 90° between said first and second rotational positions within said first mode.

9. A control implement mounting system for mounting a control implement with respect to an operator station, comprising:

a first fixed support member;

a second support member mounted upon said first fixed support member for rotational movement with respect to said first fixed support member;

a manipulation member, defining a first axis and having an operator control implement mounted thereon, mounted upon said second support member; and means mounting said manipulation member upon said second support member such that when said manipulation member is rotationally moved between first and second positions in a first mode around said first axis, said manipulation member, having said operator control implement mounted thereon, can undergo axial and rotational movements between first and second positions in both second and third modes along said first axis and around a second axis defined by said first fixed support member, respectively, such that said operator control implement can be positionally adjusted with respect to an operator station so as to adjustably position said operator control implement with respect to the operator station and thereby optimally position said operator control implement with respect to an operator disposed at the operator station whereby said operator control implement is readily accessible to the operator at the operator station regardless of the size and stature of the operator.

10. The mounting system as set forth in claim 9, further comprising:

a housing through which said manipulation member extends;

said second support member is fixedly mounted upon said housing;

first clutch means disposed within said housing and operatively associated with said manipulation member for disposing said manipulation member in a LOCKED state when said manipulation member is disposed at said first position of said first mode such that said manipulation member cannot be moved between said first and second positions of said second mode, and for disposing said manipulation member in a RELEASED state when said manipulation member is disposed at said second position of said first mode such that said manipulation member can be moved between said first and second positions of said second mode; and second clutch means interposed between said first and second support members for disposing said manipulation member in a LOCKED state when said manipulation member is disposed at said first position of said first mode such that said manipulation member cannot be moved between said first and second positions of said third mode, and for disposing said manipulation member in a RELEASED state when said manipulation member is disposed at said second position of said first mode such that said manipulation member can be moved between said first and second positions of said third mode.

11. The mounting system as set forth in claim 10, wherein said first clutch means comprises:

first and second clutch rings;

first and second sets of detent balls respectively mounted upon said first and second clutch rings so as to be movable between first positions at which said first and second sets of detent balls are engaged with said manipulation member so as to dispose said manipulation member in said LOCKED state with respect to axial movements in said second mode, and second positions at which said first and second sets of detent balls are disengaged from said manipulation member so as to dispose said manipulation member in said RELEASED state with respect to axial movements in said second mode whereby said manipulation member can be moved in opposite axial directions along said first axis; and a first cam member operatively connected to said manipulation member for moving first and second sets of detent balls between said first and second positions as said manipulation member is rotationally moved between said first and second positions of said first mode.

12. The mounting system as set forth in claim 11, wherein said second clutch means comprises:

first and second sets of detent balls respectively mounted upon said second support member so as to be movable between first positions at which said first and second sets of detent balls are engaged with said first fixed support member so as to dispose said manipulation member in said LOCKED state with respect to rotational movements in said third mode, and second positions at which said first and second sets of detent balls are disengaged from said first fixed support member so as to dispose said manipulation member in said RELEASED state with respect to rotational movements in said third mode whereby said manipulation member can be moved in opposite rotational directions around said second axis; and a second cam member operatively engaged with said first cam member for moving said first and second sets of detent balls of said second clutch means between said first and second positions as said manipulation member is moved between said first and second rotational positions of said first mode.

13. The mounting system as set forth in claim 12, wherein:

a plurality of slots are defined within said second support member; and said second cam member comprises a plurality of leg members disposed within a substantially Y-shaped array for disposition within said plurality of slots for engaging said first and second sets of detent balls of said second clutch means.

14. The mounting system as set forth in claim 12, wherein:

said manipulation member has an axially oriented slot defined within an external peripheral surface portion thereof; and said first cam member has a set screw mounted therein for disposition within said axially oriented slot defined within said external peripheral surface portion of said manipulation member such that rotational movements of said manipulation member within said first mode cause said first cam member to undergo corresponding rotational movements.

15. The mounting system as set forth in claim 14, further comprising:

an arcuate slot defined within said first cam member and comprising an arcuate extent of 90°; and a pin mounted within said housing and extending into said arcuate slot defined within said first cam member for limiting said rotational movements of said manipulation member and said first cam member to 90° between said first and second rotational positions within said first mode.

16. A control implement mounting system for mounting a control implement with respect to an operator station comprising:

a first fixed support member;

a second support member mounted upon said first fixed support member for rotational movement with respect to said first fixed support member between a first position and a second position;

a manipulation member, defining a first axis and having an operator control implement mounted thereon, mounted upon said second support member for axial movement along said first axis between a first position and a second position;

first locking means operatively associated with said manipulation member, disposable in a LOCKED state so as to retain said manipulation member at one of said first and second positions along said first axis, and disposable in a RELEASED state so as to permit said manipulation member to be axially movable along said first axis between said first and second positions;

second locking means operatively associated with said second support member, disposable in a LOCKED state so as to retain said second support member at one of said first and second positions with respect to said first fixed support member, and disposable in a RELEASED state so as to permit said second support member to be rotationally movable about a second axis defined by said first fixed support member and with respect to said first fixed support member between said first and second positions;

means mounting said manipulation member upon said second support member in such a manner that in response to rotational movements of said manipulation member between said first and second positions in a first mode around said first axis, said first and second locking means are moved from said LOCKED states to said RELEASED states so as to permit said manipulation member, having said operator control implement mounted thereon, and said second support member to undergo axial and rotational movements in second and third modes along said first axis and around said second axis between their respective first and second positions such that said operator control implement can be positionally adjusted with respect to an operator station so as to adjustably position said operator control implement with respect to the operator station and thereby optimally position said operator control implement with respect to an operator disposed at the operator station whereby said operator control implement is readily accessible to the operator at the operator station regardless of the size and stature of the operator.

17. The mounting system as set forth in claim 16, further comprising:

a housing through which said manipulation member extends;

said second support member is fixedly mounted upon said housing;

said first locking means comprises a first clutch assembly disposed within said housing and operatively associated with said manipulation member for disposing said manipulation member in said LOCKED state when said manipulation member is disposed at said first position of said first mode such that said manipulation member cannot be moved between said first and second positions of said second mode, and for disposing said manipulation member in said RELEASED state when said manipulation member is disposed at said second position of said first mode such that said manipulation member can be moved between said first and second positions of said second mode; and said second locking means comprises a second clutch assembly interposed between said first and second support members for disposing said manipulation member in said LOCKED state when said manipulation member is disposed at said first position of said first mode such that said manipulation member cannot be moved between said first and second positions of said third mode, and for disposing said manipulation member in said RELEASED state when said manipulation member is disposed at said second position of said first mode such that said manipulation member can be moved between said first and second positions of said third mode.

18. The mounting system as set forth in claim 17, wherein said first clutch assembly comprises:

first and second clutch rings;

first and second sets of detent balls respectively mounted upon said first and second clutch rings so as to be movable between first positions at which said first and second sets of detent balls are engaged with said manipulation member so as to dispose said manipulation member in said LOCKED state with respect to axial movements in said second mode, and second positions at which said first and second sets of detent balls are disengaged from said manipulation member so as to dispose said manipulation member in said RELEASED state with respect to axial movements in said second mode whereby said manipulation member can be moved in opposite axial directions along said first axis; and a first cam member operatively connected to said manipulation member for moving first and second sets of detent balls between said first and second positions as said manipulation member is rotationally moved between said first and second positions of said first mode.

19. The mounting system as set forth in claim 18, wherein said second clutch assembly comprises:

first and second sets of detent balls respectively mounted upon said second support member so as to be movable between first positions at which said first and second sets of detent balls are engaged with said first fixed support member so as to dispose said manipulation member in said LOCKED state with respect to rotational movements in said third mode, and second positions at which said first and second sets of detent balls are disengaged from said first fixed support member so as to dispose said manipulation member in said RELEASED state with respect to rotational movements in said third mode whereby said manipulation member can be moved in opposite rotational directions around said second axis; and a second cam member operatively engaged with said first cam member for moving said first and second sets of detent balls of said second clutch means between said first and second positions as said manipulation member is moved between said first and second rotational positions of said first mode.

20. The mounting system as set forth in claim 19, wherein:

a plurality of slots are defined within said second support member; and said second cam member comprises a plurality of leg members disposed within a substantially Y-shaped array for disposition within said plurality of slots for engaging said first and second sets of detent balls of said second clutch means.

21. The mounting system as set forth in claim 19, wherein:

said manipulation member has an axially oriented slot defined within an external peripheral surface portion thereof; and said first cam member has a set screw mounted therein for disposition within said axially oriented slot defined within said external peripheral surface portion of said manipulation member such that rotational movements of said manipulation member within said first mode cause said first cam member to undergo corresponding rotational movements.

22. The mounting system as set forth in claim 21, further comprising:

an arcuate slot defined within said first cam member and comprising an arcuate extent of 90°; and a pin mounted within said housing and extending into said arcuate slot defined within said first cam member for limiting said rotational movements of said manipulation member and said first cam member to 90° between said first and second rotational positions within said first mode.

* * * * *